(12) United States Patent  
Kawakami et al.

(10) Patent No.: US 7,663,707 B2  
(45) Date of Patent: Feb. 16, 2010

(54) THREE-DIMENSIONAL DISPLAY DEVICE

(75) Inventors: Kenichi Kawakami, Numazu (JP); Tamae Kawakami, Numazu (JP)

(73) Assignee: Technovates Co. Ltd. (JP)

( * ) Notice: Subject to any disclaimer, the term of this patent is extended or adjusted under 35 U.S.C. 154(b) by 264 days.

(21) Appl. No.: 11/940,559

(22) Filed: Nov. 15, 2007

(65) Prior Publication Data

US 2008/0136981 A1 Jun. 12, 2008

(30) Foreign Application Priority Data

Dec. 11, 2006 (JP) .............................. 2006-333893

(51) Int. Cl.
*G02F 1/1335* (2006.01)
(52) U.S. Cl. .......................................... 349/15; 349/62
(58) Field of Classification Search .................. 349/15, 349/61–65

See application file for complete search history.

(56) References Cited

U.S. PATENT DOCUMENTS

2009/0141201 A1* 6/2009 Yeh et al. ....................... 349/15

FOREIGN PATENT DOCUMENTS

| JP | 62-087931 | 4/1987 |
|----|-----------|--------|
| JP | 06-342262 | 12/2004 |

* cited by examiner

*Primary Examiner*—David Nelms
*Assistant Examiner*—David Y Chung
(74) *Attorney, Agent, or Firm*—BainwoodHuang

(57) ABSTRACT

A three-dimensional display device includes a liquid crystal display which has an image display surface which emits display light, a plurality of optical fibers, each of the optical fibers having a light-receiving end which receives the display light emitted from the image display surface and an emitting end which emits the display light, and a rotation device which rotates the optical fibers around a rotation axis perpendicular to the image display surface. The rotation radius of the light-receiving end and the rotation path of the emitting end of each of the optical fibers are set to have a one-to-one relationship.

6 Claims, 4 Drawing Sheets

THREE-DIMENSIONAL DISPLAY DEVICE

BACKGROUND OF THE INVENTION

The present invention relates to a three-dimensional display device which displays a three-dimensional image.

As a three-dimensional display device which displays a three-dimensional image, a three-dimensional display device which utilizes a parallax between a right eye image and a left eye image, a three-dimensional display device which projects an image onto a three-dimensional screen, and the like have been proposed. However, known three-dimensional display devices have a problem in that the viewer cannot observe the displayed image from the desired direction. To deal with this problem, a three-dimensional display device has been proposed which is capable of forming a three-dimensional image with a depth by rotating a light source which displays an image (see JP-A-6-342262 and JP-A-62-87931, for example).

A three-dimensional display device disclosed in JP-A-6-342262 has a configuration in which display sections are disposed along a rotation axis, each of the display sections having light emitting diodes (LEDs) radially disposed around the rotation axis. In this three-dimensional display device, a three-dimensional image is formed by rotating the display sections around the rotation axis while causing the LED to emit display light in synchronization with the rotation.

A three-dimensional display device disclosed in JP-A-62-87931 has a configuration in which fiber sheets which differ in height of the emitting end are radially disposed around a rotation axis. In this three-dimensional display device, a three-dimensional image is formed by rotating the fiber sheets around the rotation axis while emitting display light in synchronization with the rotation.

SUMMARY OF THE INVENTION

However, the above three-dimensional display devices have the following problems. Specifically, according to the three-dimensional display device disclosed in JP-A-6-342262, since the LED must be caused to emit light in synchronization with rotation, three-dimensional image display control is complicated and cost is increased. According to the three-dimensional display device disclosed in JP-A-62-87931, since an image switching process must be performed in synchronization with rotation, three-dimensional image display control is complicated.

The present invention has been achieved in view of the above-described problems. An object of the present invention is to provide a three-dimensional display device which facilitates image display control.

The present invention employs the following configuration in order to achieve the above object. Specifically, a three-dimensional display device according to the present invention comprises a display light source device which has an image display surface which emits display light, a plurality of light-guiding members, each of the light-guiding members having a light-receiving end which receives the display light emitted from the image display surface and an emitting end which emits the display light, and a rotation device which rotates the light-guiding members around a rotation axis perpendicular to the image display surface, wherein a rotation radius of the light-receiving end and a rotation path of the emitting end of each of the light-guiding members are set to have a one-to-one relationship.

According to the present invention, since the display light supplied to the light-guiding member need not be changed in synchronization with the rotation of the light-guiding member, three-dimensional image display can be easily controlled.

Specifically, a circular image is formed when one light-guiding member rotates while emitting the display light from the emitting end. A plurality of circular images are formed when a plurality of light-guiding members rotate while emitting the display light. In this case, since the rotation radius of the light-receiving end and the rotation path of the emitting end of each light-guiding member are set to have a one-to-one relationship, the rotation path of the emitting end (i.e., the height coordinate and the rotation radius coordinate (depth coordinate) of the emitting end) differs depending on the rotation radius of the light-receiving end. Therefore, the light emission coordinates are determined corresponding to the rotation radius coordinate and the rotation angle coordinate of the image display surface and the light-receiving end, whereby a three-dimensional image is displayed in the rotation region of the emitting ends.

The light-guiding member which is located at the same display light position necessarily emits the same display light at the same coordinates. Therefore, a three-dimensional image of a different color or luminance can be displayed corresponding to the emission coordinate position without changing the display light corresponding to the rotation of the light-guiding member by setting specific display light (color or luminance) at a position of the image display surface corresponding to the light emission coordinates. Therefore, three-dimensional image display control can be facilitated, whereby the manufacturing cost can be reduced.

In the three-dimensional display device according to the present invention, it is preferable that the image display surface have a plurality of display pixels disposed along the rotation path of the light-receiving end of each of the light-guiding members.

According to the present invention, various three-dimensional images are displayed by disposing the display pixels along the rotation path of the light-receiving end and causing different types of display light to be emitted from the emitting end corresponding to the rotation of the light-guiding member.

It is preferable that the three-dimensional display device according to the present invention include a luminance correction mechanism which increases the luminance of the display light emitted from the emitting end as the rotation radius of the emitting end increases.

According to the present invention, the luminance of the display light displayed by the emitting ends which differ in rotation radius can be made uniform, whereby the display quality of the three-dimensional image is improved. Specifically, the moving distance of the emitting end per unit time during rotation around the rotation axis increases as the rotation radius of the emitting end increases. Therefore, the luminance per unit distance of the display light emitted from the emitting end decreases as the rotation radius of the emitting end increases. Accordingly, the luminance of the display light emitted from each emitting end becomes uniform by causing the display light with a higher luminance to be emitted from the emitting end with a larger rotation radius.

In the three-dimensional display device according to the present invention, it is preferable that the area of the emitting end of the light-guiding member increase as the rotation radius of the emitting end increases.

According to the present invention, the luminance of the display light emitted from each emitting end becomes uniform in the same manner as described above by increasing the area of the emitting end as the rotation radius of the emitting end increases.

In the three-dimensional display device according to the present invention, it is preferable that the number of the light-guiding members of which the emitting end has an identical rotation path increase as the rotation radius of the emitting end increases.

According to the present invention, the luminance of the image displayed by each emitting end which moves in each rotation path becomes uniform in the same manner as described above by increasing the number of the light-guiding members of which the rotation path of the emitting end is identical as the rotation radius of the emitting end increases.

In the three-dimensional display device according to the present invention, it is preferable that the light-guiding member include an amplification device which amplifies the display light.

According to the present invention, the intensity of the display light received by the light-receiving end is increased, and the resulting display light is emitted from the emitting end.

In the three-dimensional display device according to the present invention, since the rotation radius of the light-receiving end and the rotation path of the emitting end of each light-guiding member are set to have a one-to-one relationship, a three-dimensional image can be easily displayed without changing the display light corresponding to the rotation of the light-guiding member.

DETAILED DESCRIPTION OF THE INVENTION
AND PREFERRED EMBODIMENTS

Figure 1:
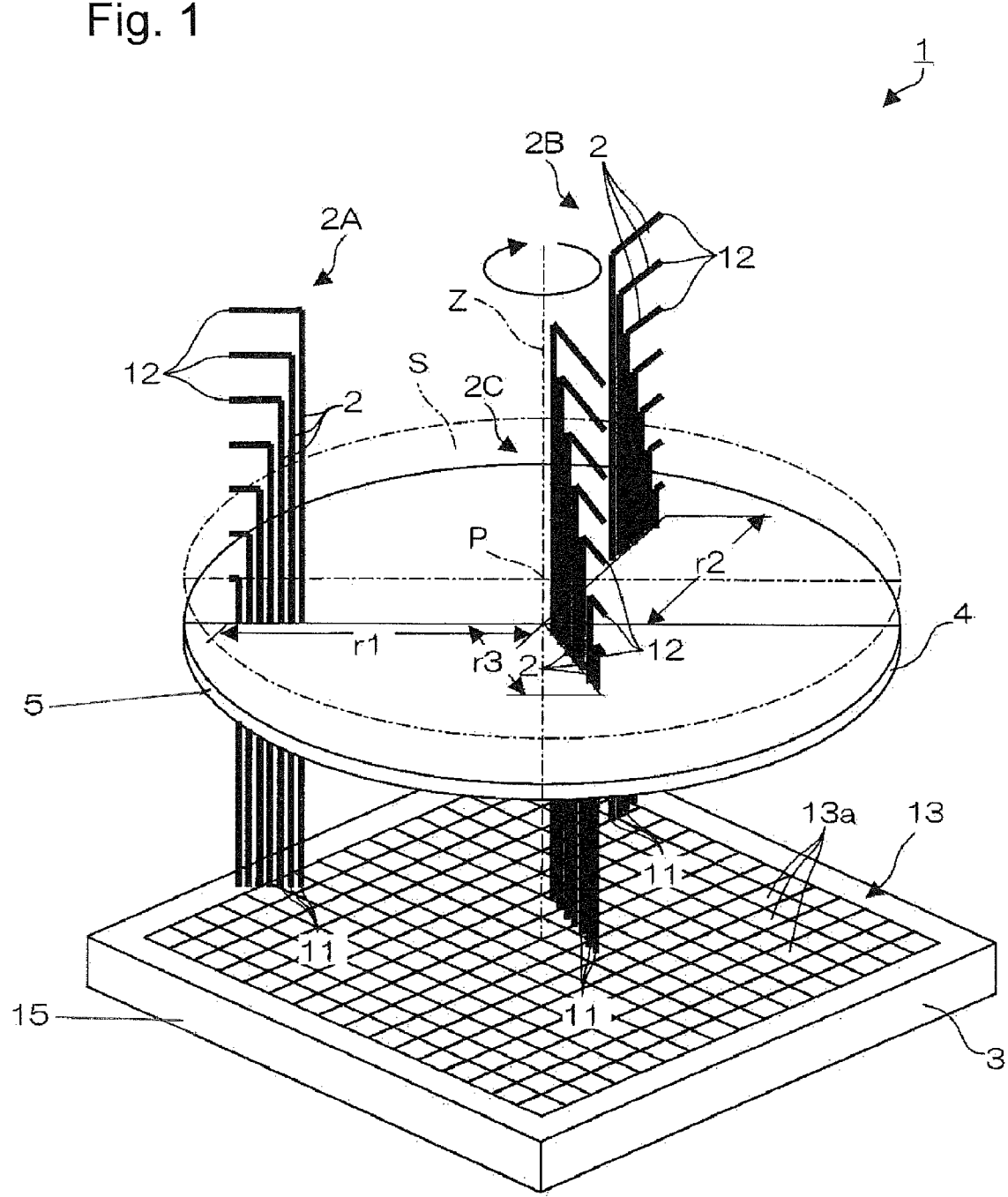
FIG. 1 is a schematic configuration diagram showing a three-dimensional display device according to a first embodiment.
Figure 2:
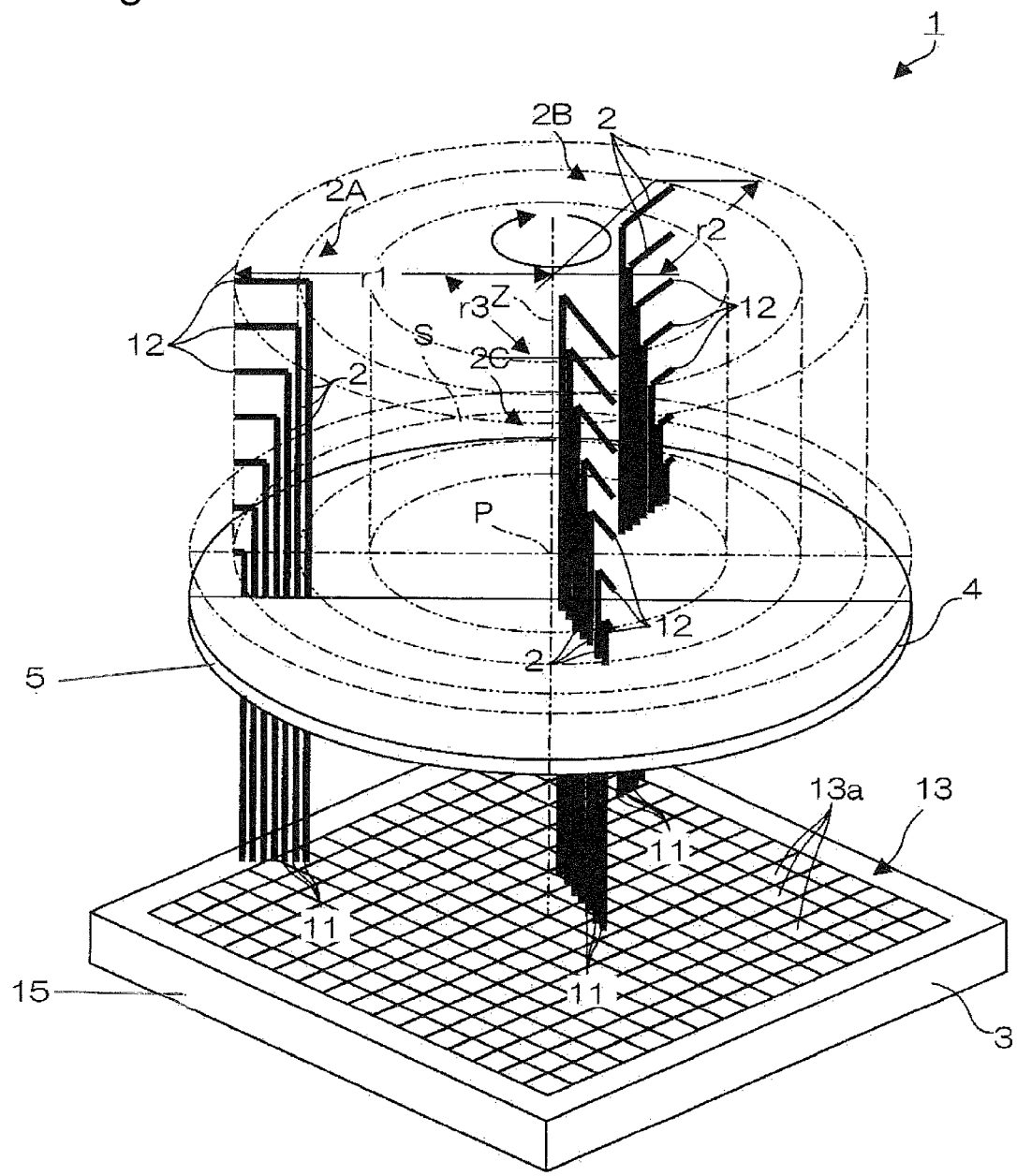
FIG. 2 is a view illustrative of the display state of a three-dimensional image.

A first embodiment of the three-dimensional display device according to the present invention is described below with reference to the drawings. In the drawings used for the following description, each member is scaled to have an appropriate size. FIG. 1 is a schematic configuration diagram showing a three-dimensional display device according to this embodiment, and FIG. 2 is a view illustrative of the display state of a three-dimensional image.

A three-dimensional display device 1 according to this embodiment is a display device used for three-dimensional display of the interior of a building or a house. As shown in FIG. 1, the three-dimensional display device 1 includes optical fibers (light-guiding members) 2, a liquid crystal display (display light source device) 3 which supplies display light to the optical fibers 2, a support stage 4 which supports the optical fibers 2, and a rotation device 5 which rotates the support stage 4 around a rotation axis Z. A plane perpendicular to the rotation axis Z is referred to as a reference plane S, and the intersection point of the rotation axis Z and the reference plane S is referred to as a reference point P.

One end of each optical fiber 2 is a light-receiving end 11 which faces the liquid crystal display 3 and receives the display light emitted from the liquid crystal display 3, and the other end of each optical fiber 2 is an emitting end 12 which emits the display light. The optical fibers 2 are appropriately curved so that the light-receiving ends 11 differ in rotation radius around the rotation axis Z. Specifically, the light-receiving ends 11 of the optical fibers 2 differ in rotation path around the rotation axis Z. The rotation path of each light-receiving end 11 is positioned in the same plane.

The optical fibers 2 are appropriately curved so that the emitting ends 12 emit the display light in the planar direction of the reference plane S (direction perpendicular to the rotation axis Z). The emitting ends 12 differ in rotation radius and height depending on the rotation radii of the corresponding light-receiving ends 11. Specifically, the rotation radius of the light-receiving end 11 and the rotation path of the emitting end 12 of the optical fiber 2 are set to have a one-to-one relationship. Therefore, the coordinates (rotation radius r) (corresponding to the coordinates of the light-receiving end 11) of an image display surface 13 are provided with two pieces of coordinate information including the rotation radius r and the height z of the emitting end 12, thereby making it unnecessary to change the image in synchronization with rotation.

Specifically, the optical fibers 2 make up first to third fiber groups 2A to 2C into which the optical fibers are divided depending on the rotation radius of the emitting end 12 around the rotation axis Z.

The optical fibers 2 making up the first fiber group 2A are disposed so that the rotation radius of each emitting end 12 around the rotation axis Z is r1. These optical fibers 2 are appropriately curved so that the emitting ends 12 differ in height with respect to the reference plane S. Therefore, a columnar image with a radius of r1 is formed when the optical fibers 2 making up the first fiber group 2A rotate around the rotation axis Z.

The optical fibers 2 making up the second fiber group 2B are disposed so that the rotation radius of each emitting end 12 around the rotation axis Z is r2 (r2<r1). These optical fibers 2 are appropriately curved so that the emitting ends 12 differ in height with respect to the reference plane S. Therefore, a columnar image with a radius of r2 is formed when the optical fibers 2 making up the second fiber group 2B rotate around the rotation axis Z.

The optical fibers 2 making up the third fiber group 2C are disposed so that the rotation radius of each emitting end 12 around the rotation axis Z is r3 (r3<r2). These optical fibers 2 are appropriately curved so that the emitting ends 12 differ in height with respect to the reference plane S. Therefore, a columnar image with a radius of r3 is formed when the optical fibers 2 making up the third fiber group 2C rotate around the rotation axis Z.

Therefore, three coaxial columnar images are formed when the optical fibers 2 forming the first to third fiber groups 2A to 2C rotate around the rotation axis Z.

The liquid crystal display 3 has the image display surface 13 facing the light-receiving ends 11 of the optical fibers 2, and emits the display light to each optical fiber 2 from the image display surface 13. The liquid crystal display 3 includes display pixels 13a disposed on the image display surface 13 in a matrix.

The display pixels 13a are disposed along the rotation paths of the light-receiving ends 11 of the optical fibers 2. The display pixel 13a allows the display light to be incident on the light-receiving end 11 facing the display pixel 13a and to be guided through the optical fiber 2.

Since the light-receiving ends 11 of the optical fibers 2 form different rotation paths, each display pixel 13a is configured to emit the display light to one optical fiber 2. Each display pixel 13a is configured to emit the display light corresponding to an image displayed at the position of the emitting end 12 of the optical fiber 2 when the light-receiving end 11 of the optical fiber 2 faces the display pixel 13a due to rotation around the rotation axis Z.

For example, when the position of the emitting end 12 of the optical fiber 2 with respect to the reference point P is expressed using a cylindrical coordinate system (r, φ, z) (wherein r is the rotation radius, φ is the rotation angle, and z is the height (distance) from the reference plane S), each display pixel 13a emits the display light corresponding to an image corresponding to the coordinate position (r, φ, z) of the emitting end 12 of the optical fiber 2 having the light-receiving end 11 disposed opposite to the display pixel 13a due to rotation around the rotation axis Z.

The liquid crystal display 3 is connected with a luminance control section (luminance control device) 15 which causes the display light with a higher luminance to be emitted to the light-receiving end 11 of the optical fiber 2 as the rotation radius of the emitting end 12 increases. Specifically, the moving distance of the emitting end 12 per unit time during rotation around the rotation axis Z increases as the rotation radius of the emitting end 12 increases. Therefore, the luminance per unit distance of the display light emitted from the emitting end 12 decreases as the rotation radius of the emitting end 12 increases. Therefore, the luminance control section 15 increases the luminance of the display light emitted from the display pixel 13a as the rotation radius of the emitting end 12 of the optical fiber 2 facing the display pixel 13a increases, whereby the luminance per unit distance of the display light emitted from the emitting end 12 of each optical fiber 2 becomes almost equal.

As shown in FIG. 1, the support stage 4 supports the optical fibers 2 so that the optical fibers 2 are rotatable around the rotation axis Z, and shields the display light which is emitted from the image display surface 13 and is not received by the optical fibers 2.

The rotation device 5 includes a motor or the like, and rotates the optical fibers 2 supported by the support stage 4 around the rotation axis Z.

A three-dimensional image display method using the three-dimensional display device 1 having the above configuration is described below.

The liquid crystal display 3 emits the display light from each display pixel 13a forming the image display surface 13. Each optical fiber 2 receives the display light emitted from the display pixel 13a disposed opposite to its light-receiving end 11. The optical fiber 2 emits the display light guided therethrough to the outside from the emitting end 12. When the rotation device 5 rotates the optical fibers 2 around the rotation axis Z, each optical fiber 2 receives the display light emitted from the display pixel 13a disposed opposite to its light-receiving end 11 through the light-receiving end 11 at each rotation position, and emits the display light to the outside from the emitting end 12.

Therefore, when the optical fiber 2 rotates around the rotation axis Z, a circular image is formed along the rotation path of the emitting end 12. Since the rotation paths of the emitting ends 12 of the first fiber group 2A differ in height, a columnar image with a radius of r1 is formed by the optical fibers 2 making up the first fiber group 2A, as shown in FIG. 2. Likewise, a columnar image with a radius of r2 and a columnar image with a radius of r3 are respectively formed by the optical fibers 2 making up the second fiber group 2B and the optical fibers 2 making up the third fiber group 2C. Specifically, the rotation paths of the emitting ends 12 which differ in rotation radius are obtained by the first fiber group 2A, the second fiber group 2B, and the third fiber group 2C.

When each display pixel 13a faces the light-receiving end 11 of the optical fiber 2 due to rotation, each display pixel 13a emits the display light corresponding to an image displayed at the position of the emitting end 12 of the optical fiber 2. Therefore, each optical fiber 2 can receive different display light each time the light-receiving end 11 faces a different display pixel 13a due to rotation, and can emit the received display light from the emitting end 12. This allows various three-dimensional images to be displayed by each optical fiber 2.

Moreover, since the luminance control section 15 increases the luminance of the display light emitted from the display pixel 13a as the rotation radius of the emitting end 12 of the optical fiber 2 increases, the luminance per unit distance of the display light emitted from the emitting end 12 of each optical fiber 2 becomes almost equal. This allows a high-quality three-dimensional image to be displayed.

A three-dimensional image is thus displayed using the three-dimensional display device 1.

In the three-dimensional display device 1 according to this embodiment, since the rotation radius of the light-receiving end 11 of the optical fiber 2 and the rotation path of the emitting end 12 are set to have a one-to-one relationship, as described above, the rotation path of the emitting end 12 (i.e., the height coordinate and the rotation radius coordinate (depth coordinate) of the emitting end 12) differs depending on the rotation radius of the light-receiving end 11. Therefore, the light emission coordinates are determined corresponding to the rotation radius coordinates and the rotation angle coordinates of the image display surface 13 and the light-receiving end 11, whereby a three-dimensional image is displayed in the rotation region of the emitting end 12.

A three-dimensional image of a different color or luminance can be displayed corresponding to the emission coordinate position without changing the display light corresponding to the rotation of the optical fiber 2 by setting specific display light (color or luminance) at a position of the image display surface 13 corresponding to the light emission coordinates. Therefore, three-dimensional image display can be easily controlled, and the manufacturing cost can be reduced.

Since the display pixels 13a are disposed along the rotation path of the light-receiving end 11, different types of display light can be emitted from the emitting end 12 of the optical fiber 2 corresponding to rotation, whereby various three-dimensional images can be displayed.

Moreover, since the luminance control section 15 equalizes the luminance of the display light displayed by the emitting ends 12 with different rotation radii, the display quality of the three-dimensional image displayed by each optical fiber 2 is improved.

Figure 3:
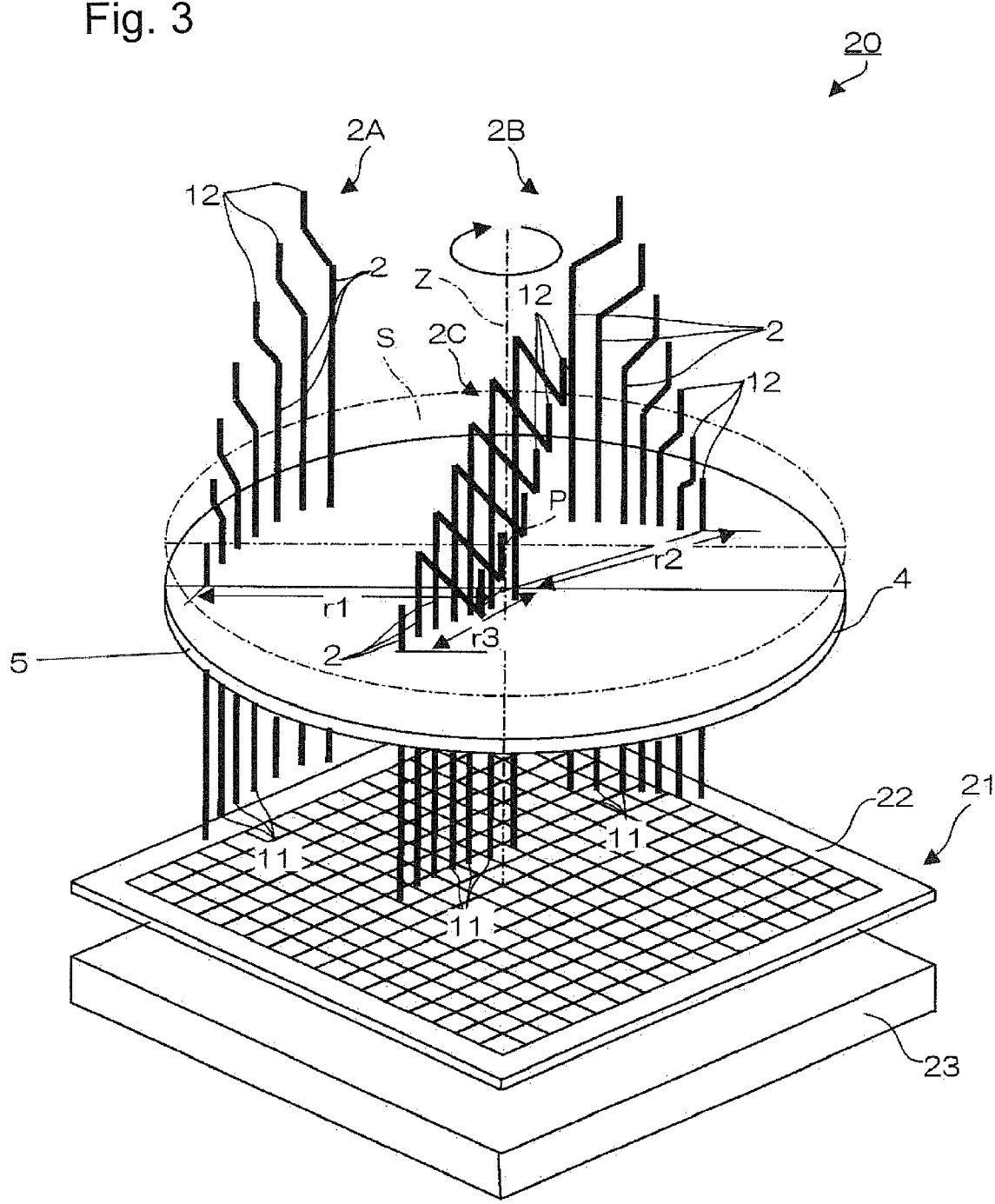
FIG. 3 is a schematic configuration diagram showing a three-dimensional display device according to a second embodiment.

A second embodiment of the three-dimensional display device according to the present invention is described below with reference to FIG. 3. The same elements described in the above embodiment are indicated by the same symbols. Detailed description of these elements is omitted.

The second embodiment differs from the first embodiment as to the following point. Specifically, in a three-dimensional display device 20 according to the second embodiment, the emitting end 12 of each optical fiber 2 is disposed to face upward, and the display light is emitted from the emitting end 12 of each optical fiber 2 in the direction perpendicular to the reference plane S, as shown in FIG. 3.

Specifically, the three-dimensional display device 20 has the first to third fiber groups 2A to 2C in the same manner as described above. The optical fibers 2 making up the first fiber group 2A are disposed so that the rotation radius of each emitting end 12 around the rotation axis Z is r1 in the same manner as in the above embodiment. These optical fibers 2 are appropriately curved so that the emitting ends 12 differ in height with respect to the reference plane S. Therefore, columnar images having a radius of r1 and differing in height are formed when the optical fibers 2 making up the first fiber group 2A rotate around the rotation axis Z.

The optical fibers 2 making up the second fiber group 2B are disposed so that the rotation radius of each emitting end 12 around the rotation axis Z is r2 (r2<r1) in the same manner as the optical fibers 2 making up the first fiber group 2A. Therefore, columnar images having a radius of r2 and differing in height are formed by the optical fibers 2 making up the second fiber group 2B.

The optical fibers 2 making up the third fiber group 2C are disposed so that the rotation radius of each emitting end 12 is r3 (r3<r2). Therefore, columnar images having a radius of r3 and differing in height are formed by the optical fibers 2 making up the third fiber group 2C.

The three-dimensional display device 20 includes a display light source (display light source device) 21 which supplies display light to the light-receiving end 11 of each optical fiber 2. The display light source 21 includes a film 22 in which an image displayed by the emitting end 12 of each optical fiber 2 rotated around the rotation axis Z is formed in each display pixel 13a, and an illumination light source 23 which applies illumination light to the film 22. The film 22 can be replaced corresponding to the three-dimensional image to be displayed.

According to the three-dimensional display device 20 having the above configuration, three circular images differing in radius and height are formed by the first to third fiber groups 2A to 2C. When each display pixel 13a faces the light-receiving end 11 of the optical fiber 2 due to rotation, each display pixel 13a emits the display light corresponding to an image displayed at the position of the emitting end 12 of the optical fiber 2. A three-dimensional image is thus displayed using the three-dimensional display device 20.

As described above, the three-dimensional display device 20 according to this embodiment achieves the same effects as described above.

Figure 4:
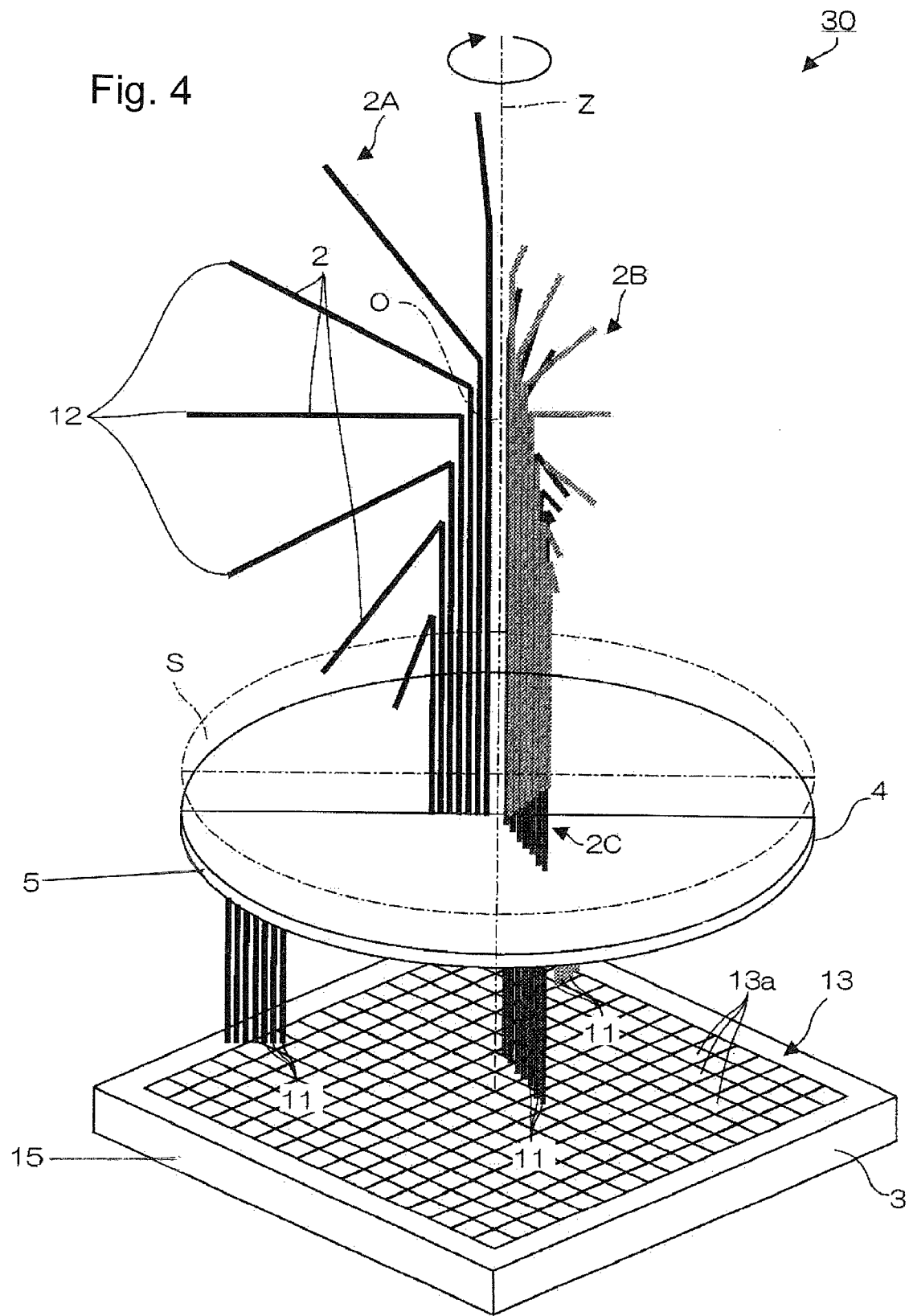
FIG. 4 is a schematic configuration diagram showing a three-dimensional display device according to a third embodiment.

A third embodiment of the three-dimensional display device according to the present invention is described below with reference to FIG. 4. The same elements described in the above embodiments are indicated by the same symbols. Detailed description of these elements is omitted.

The third embodiment differs from the first embodiment as to the following point. Specifically, in a three-dimensional display device 30 according to the third embodiment, the display light is emitted from the emitting end 12 of each optical fiber 2 radially with respect to the reference point P, as shown in FIG. 4.

Specifically, the three-dimensional display device 30 has the first to third fiber groups 2A to 2C in the same manner as described above. The optical fibers 2 making up the first fiber group 2A are disposed so that the distance between each emitting end 12 and a point O on the rotation axis Z is r1. These optical fibers 2 are appropriately curved so that the emitting ends 12 differ in height with respect to the reference plane S. Therefore, a spherical image with a radius of r1 is formed when the optical fibers 2 making up the first fiber group 2A rotate around the rotation axis Z.

The optical fibers 2 making up the second fiber group 2B are disposed so that the distance between each emitting end 12 and the point O is r2 (r2<r1) in the same manner as the optical fibers 2 making up the first fiber group 2A. Therefore, a spherical image with a radius of r2 is formed by the optical fibers 2 making up the second fiber group 2B.

The optical fibers 2 making up the third fiber group 2C are disposed so that the distance between each emitting end 12 and the point O is r3 (r3<r2). Therefore, a spherical image with a radius of r3 is formed by the optical fibers 2 making up the third fiber group 2C.

According to the three-dimensional display device 30 having the above configuration, three spherical images are formed by the first to third fiber groups 2A to 2C. Each display pixel 13a emits the display light corresponding to an image displayed at the position of the emitting end 12 of the optical fiber 2 when the light-receiving end 11 of the optical fiber 2 faces the display pixel 13a due to rotation around the rotation axis Z. A three-dimensional image is thus displayed using the three-dimensional display device 30.

As described above, the three-dimensional display device 30 according to this embodiment achieves the same effects as described above.

The present invention is not limited to the above embodiments. Various modifications and variations may be made without departing from the spirit and scope of the present invention.

For example, three optical fiber groups are made up by the optical fibers in the above embodiments. Note that two or four or more optical fiber groups may be formed. The depth can be displayed with a high definition by providing a larger number of optical fiber groups. It suffices that the three-dimensional display device display a three-dimensional image and include at least two optical fibers which differ in rotation paths of the light-receiving end and the emitting end.

The light-guiding member is not limited to the optical fiber insofar as the light-guiding member can guide the display light emitted from the liquid crystal display.

The display light source device is not limited to the liquid crystal display or the device formed by combining the film on which the image is recorded and the illumination light source which applies the illumination light to the film. The display light source device may be other light source device such as an organic EL display.

In the above embodiments, the luminance of the image formed by each emitting end is made equal by causing the luminance control section to increase the luminance of the display light supplied to the light-receiving end of the optical fiber of which the rotation radius of the emitting end is larger. Note that the following configuration may also be employed. Specifically, the luminance of the display light emitted from the emitting end with a larger rotation radius may be increased by increasing one of the area of the emitting end of the light-guiding member, a diameter of the light-guiding member, and an area of the light-receiving end of the light-guiding member as the rotation radius of the emitting end increases, whereby the luminance of the image formed by each emitting end may be made equal.

Alternatively, the number of optical fibers having an emitting end which moves in the identical rotation path may be increased as the rotation radius of the emitting end increases so that the sum of the luminance of the display light in the identical rotation path increases, whereby the luminance of the image formed in each rotation path may be made equal. In this case, the optical fiber which is located over the same display pixel necessarily emits the same display light at the same coordinates. These measures and the luminance control section may be appropriately used in combination.

An amplification device (e.g., optical amplifier) which amplify the intensity of the display light may be provided between the light-receiving end and the emitting end of the optical fiber. According to this configuration, the intensity of the display light received by the light-receiving end can be amplified, and the resulting display light can be emitted from the emitting end. An image displayed by the optical fibers is not limited to a still image, but may be a moving image.

The application of the three-dimensional display device according to the present invention is not limited to an interior and the like. The three-dimensional display device according to the present invention may also be used for other three-dimensional display applications.

What is claimed is:

1. A three-dimensional display device comprising:
   a display light source device which has an image display surface which emits display light;
   a plurality of light-guiding members, each of the light-guiding members having a light-receiving end which receives the display light emitted from the image display surface and an emitting end which emits the display light; and
   a rotation device which rotates the light-guiding members around a rotation axis perpendicular to the image display surface;
   wherein a rotation radius of the light-receiving end and a rotation path of the emitting end of each of the light-guiding members are set to have a one-to-one relationship.

2. The three-dimensional display device according to claim 1, wherein the image display surface has a plurality of display pixels disposed along the rotation path of the light-receiving end of each of the light-guiding members.

3. The three-dimensional display device according to claim 1, the three-dimensional display device including a luminance correction mechanism which increases the luminance of the display light emitted from the emitting end as the rotation radius of the emitting end increases.

4. The three-dimensional display device according to claim 1, wherein one of the area of the emitting end of the light-guiding member, a diameter of the light-guiding member, and an area of the light-receiving end of the light-guiding member increases as the rotation radius of the emitting end increases.

5. The three-dimensional display device according to claim 1, wherein the number of the light-guiding members of which the emitting end has an identical rotation path increases as the rotation radius of the emitting end increases.

6. The three-dimensional display device according to claim 1, wherein the light-guiding member includes an amplification device which amplifies the display light.

* * * * *